United States Patent
Baldwin et al.

(10) Patent No.: US 6,977,649 B1
(45) Date of Patent: Dec. 20, 2005

(54) 3D GRAPHICS RENDERING WITH SELECTIVE READ SUSPEND

(75) Inventors: David Robert Baldwin, Weybridge (GB); Simon James Moore, Horsham (GB)

(73) Assignee: 3DLABS, Inc. LTD, Hamilton (BM)

( * ) Notice: Subject to any disclaimer, the term of this patent is extended or adjusted under 35 U.S.C. 154(b) by 0 days.

(21) Appl. No.: 09/280,250

(22) Filed: Mar. 29, 1999

Related U.S. Application Data

(60) Provisional application No. 60/109,733, filed on Nov. 23, 1998.

(51) Int. Cl.$^7$ ............................................. G06T 17/00
(52) U.S. Cl. ................................................... 345/419
(58) Field of Search ................................ 345/430, 431, 345/433, 435, 419, 422, 424, 441, 442, 443, 345/502, 503, 505, 506, 509, 536, 537, 538, 345/545, 547, 548, 553, 582, 589, 619, 629

(56) References Cited

U.S. PATENT DOCUMENTS

| | | | |
|---|---|---|---|
| 4,866,637 A | 9/1989 | Gonzalez-Lopez et al. | 364/518 |
| 4,885,703 A | 12/1989 | Deering | 364/522 |
| 4,903,141 A | 2/1990 | Morton et al. | 358/448 |
| 5,351,067 A | 9/1994 | Lumelsky et al. | 395/191 |
| 5,485,559 A | 1/1996 | Sakaibara et al. | 395/133 |
| 5,526,255 A | 6/1996 | Shenk | 364/167.01 |
| 5,546,530 A | 8/1996 | Grimaud et al. | 395/163 |
| 5,594,854 A | 1/1997 | Baldwin et al. | 395/141 |
| 5,640,496 A | 6/1997 | Hardy et al. | 395/121 |
| 5,675,773 A | 10/1997 | Devic | 395/503 |
| 5,727,190 A | 3/1998 | Derby et al. | 395/503 |
| 5,742,796 A * | 4/1998 | Huxley | 395/502 |
| 5,772,297 A | 6/1998 | Loo et al. | 345/419 |
| 5,774,132 A | 6/1998 | Uchiyama | 345/503 |
| 5,790,134 A | 8/1998 | Lentz | 345/501 |
| 5,822,591 A | 10/1998 | Hochmuth | 395/705 |
| 5,825,936 A | 10/1998 | Clarke et al. | 382/261 |
| 5,831,640 A * | 11/1998 | Wang et al. | 345/521 |
| 6,047,334 A * | 4/2000 | Langendorf et al. | 710/5 |
| 6,073,210 A * | 6/2000 | Palanca et al. | 711/118 |
| 6,111,582 A * | 8/2000 | Jenkins | 345/421 |

* cited by examiner

*Primary Examiner*—Almis Jankus
(74) *Attorney, Agent, or Firm*—Groover & Holmes; Robert O. Groover; Patrick C. R. Holmes

(57) ABSTRACT

A system and method for increasing rendering efficiency in pipelined graphics systems. In the disclosed embodiments, reads of pixel information during the rendering of a primitive are suspend if the pixel information has not been updated by a previous primitive. In some embodiments, reads of pixel information are also suspended periodically when a table tracking the information becomes full. In some embodiments a Read Monitor Unit 108 controlled by the graphics system's Memory Controller 106 is used to track pixels which have been affected by rendered primitives. In some embodiments, a history list is used to avoid suspension of reads for antialiased lines. In a particular embodiment, the table used to track affected pixels is two-bits, the first bit tracking whether the pixel has been touched by a primitive since the last SuspendReads command was invoked and the second bit tracking whether the pixel has been touched by the current primitive. Both bits are reset when a power on or SuspendReads command occurs. The second bit is also reset at the start of rendering for each primitive. In a separate embodiment, a unique number is assigned to each primitive to be rendered. The number is recorded for each active pixel touched by the primitive. If an earlier primitive has touched this pixel, suspension of reads can be invoked and the table reset (i.e., every entry is marked invalid).

40 Claims, 4 Drawing Sheets

3D GRAPHICS RENDERING WITH SELECTIVE READ SUSPEND

CROSS-REFERENCE TO RELATED APPLICATION

This application claims priority from Ser. No. 60/109,733, filed Nov. 23, 1998, which is hereby incorporated by reference.

BACKGROUND AND SUMMARY OF THE INVENTION

The present invention relates to computer graphics, particularly to memory read and write commands between primitives.

Background: Computer Graphics and Rendering

Modern computer systems normally manipulate graphical objects as high-level entities. For example, a solid body may be described as a collection of triangles with specified vertices, or a straight line segment may be described by listing its two endpoints with three-dimensional or two-dimensional coordinates. Such high-level descriptions are a necessary basis for high-level geometric manipulations. These descriptions also have the advantage of providing a compact format which does not consume memory space unnecessarily.

Such higher-level representations are very convenient for performing the many required computations. For example, ray-tracing or other lighting calculations may be performed and a projective transformation can be used to reduce a three-dimensional scene to its two-dimensional appearance from a given viewpoint. However, when an image containing graphical objects is to be displayed, a very low-level description is needed. For example, in a conventional CRT display, a "flying spot" is moved across the screen (one line at a time), and the beam from each of three electron guns is switched to a desired level of intensity as the flying spot passes each pixel location. Thus, at some point the image model must be translated into a data set which can be used by a conventional display. This operation is known as "rendering."

A graphics-processing system typically interfaces to the display controller through a "frame store" or "frame buffer". The frame store can be written to randomly by the graphics processing system, and also provides the synchronous data output needed by the video output driver. (Digital-to-analog conversion is also provided after the frame buffer.) This interface relieves the graphics-processing system of most of the burden of synchronization for video output. Nevertheless, the amounts of data which must be moved around are very sizable and the computational and data-transfer burden of placing the correct data into the frame buffer can still be very large.

Even if the computational operations required are quite simple, they must be performed repeatedly on a large number of datapoints. If blending is desired, additional bits (e.g., another 8 bits per pixel) will be required to store an "alpha" (or "transparency value") for each pixel. This calculation implies manipulation of more than 3 billion bits per second without allowing for any of the actual computations being performed. Thus, it may be seen that this environment has unique data manipulation requirements.

If the display is unchanging, no demand is placed on the rendering operations. However, some common operations (such as zooming or rotation) will require every object in the image space to be re-rendered. Slow rendering will make the rotation or zoom appear jerky. This effect is highly undesirable. Thus, efficient rendering is an essential step in translating an image representation into the correct pixel values. Need for efficient rendering is particularly acute in animation applications where newly rendered updates to a computer graphics display must be generated at regular intervals.

The rendering requirements of three-dimensional graphics are particularly heavy. One reason for such heavy requirements is that even after the three-dimensional model has been translated to a two-dimensional model some computational tasks may be bequeathed to the rendering process. (For example, color values will need to be interpolated across a triangle or other primitive.) These computational tasks tend to burden the rendering process. Another reason is that since three-dimensional graphics are much more lifelike, users are more likely to demand a fully rendered image. (By contrast, in the two-dimensional images created e.g., by a GUI or simple game, users will learn not to expect all areas of the scene to be active or filled with information.)

FIG. 2 is a very high-level view of other processes performed in a 3D graphics computer system. A three dimensional image which is defined in some fixed 3D coordinate system (a "world" coordinate system) is transformed into a viewing volume (determined by a view position and direction), and the parts of the image which fall outside the viewing volume are discarded. The visible portion of the image volume is then projected onto a viewing plane, in accordance with the familiar rules of perspective. This produces a two-dimensional image, which is now mapped into device coordinates. It is important to understand that all of these operations occur prior to the operations performed by the rendering subsystem of the present invention.

Background: Read-Modify-Write

In graphics systems, a read-modify-write operation is relied on when rendering primitives. Information regarding primitives is read from specific memory locations. If the information is modified, it must be written back in order for any new values to be used in later processing. In a heavily pipelined system, the individual functions of this read-modify-write operation can be widely separated in time. A situation can occur in which a second read on a memory location is needed while outstanding data from a first read of the same location has been modified but has not yet been written back. If this situation is not properly handled, the second read will return the same data as the first read. In graphics, this is guaranteed not to occur within a primitive as the rasterization rules forbid it, but it can happen between primitives.

Currently, the solution to this second read problem is to force all outstanding writes to complete before any reads for the new primitive begin. Implementation of this solution is generally through a message such as SuspendReads (or such as a PrepareToRender message as in earlier generation pipelined graphics processors). The Read unit (of a read/write processor pair for either the localbuffer or framebuffer) receives the SuspendsReads message and writes it to address FIFO (linking it to the Memory Controller). The message is also forwarded down the pipeline. The Read Unit continues to generate messages to the address FIFO. However, the Memory Controller will not issue reads on these addresses (the Memory Controller processes reads as high priority until it encounters a SuspendReads command). The Write Unit inserts write addresses and data into the Write FIFO (address and data). Once the Write unit receives the SuspendsReads message, it inserts this message into its queue (the message is renamed to ResumeReads for clarity). The message is then passed down the pipeline. Since the Memory Controller has suspended read processing it can process write requests. Write requests are processed until the Memory Controller reaches the ResumeReads message. Once the Memory Controller knows the last writes have completed (or are unconditionally committed), the ResumeReads message is acted upon and the read portion of the Memory Controller is released to allow further reads.

This message passing mechanism is very simple and robust. However, the time delay between the suspend and resume commands reaching the Memory Controller and being acted upon can take close to 45 cycles (or more). This is a big increase over previous chips and has arisen due to using significantly higher levels of pipelining in the core units of the graphics processor, an increase in the number of cycles of latency in the memories, largely because of their synchronous nature, and re-synchronizing between core and memory clock domains.

The desire to increase the small primitive rate by reducing the number of set up cycles has exposed the suspend/resume feedback path as a bottleneck which must be overcome to increase the small primitive rate.

A Read Monitor Unit

This application discloses an innovative system and method for increasing rendering efficiency in pipelined graphics systems. In the disclosed embodiments, reading of pixel information during the rendering of a primitive is suspend if the pixel information has been touched by a previous write. In some embodiments, reads of pixel information are also suspended periodically when a table tracking the information becomes full. In some embodiments a Read Monitor Unit controlled by the graphics system's Memory Controller is used to track pixels which have been affected by rendered primitives. In some embodiments, a history list is used to avoid suspension of reads for overlapping primitives. In a particular embodiment, the table used to track affected pixels is two-bits, the first bit tracking whether the pixel has been touched by a primitive since the last SuspendReads command was invoked and the second bit tracking whether the pixel has been touched by the current primitive. When a power on reset or a SuspendReads command occurs, both the first and second bits are reset. The second bit is also reset at the start of rendering for each primitive. In a separate embodiment, a unique number is assigned to each primitive to be rendered. The number is recorded for each active pixel touched by the primitive. If an earlier primitive has touched this pixel, suspension of reads can be invoked and the table reset (i.e., every entry is marked invalid).

The disclosed innovations, in various embodiments, provide one or more of at least the following advantages:

savings in processing time by preventing unnecessary suspension of reads.

increased throughput in primitive rendering.

cost savings due to less stringent processing requirements.

The presently preferred embodiment offers the advantage of avoiding an automatic SuspendReads and clearing of the table every 32 primitives.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
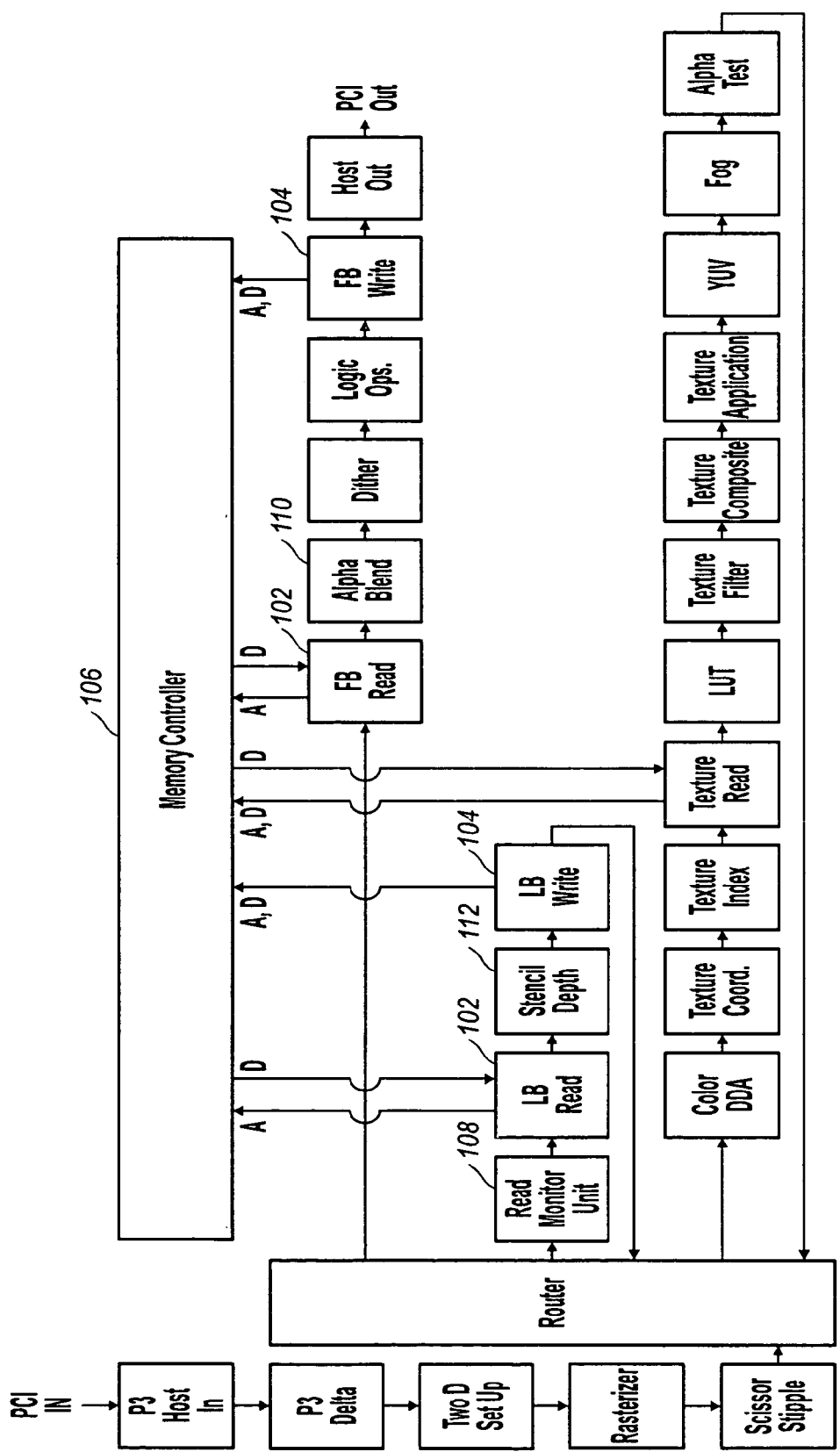
FIG. 1 is an overview of a graphics rendering subsystem which can utilize the disclosed embodiments of the read-modify-write solution depicting the Read, Read Monitor, Write, and Memory Controller units.
Figure 2:
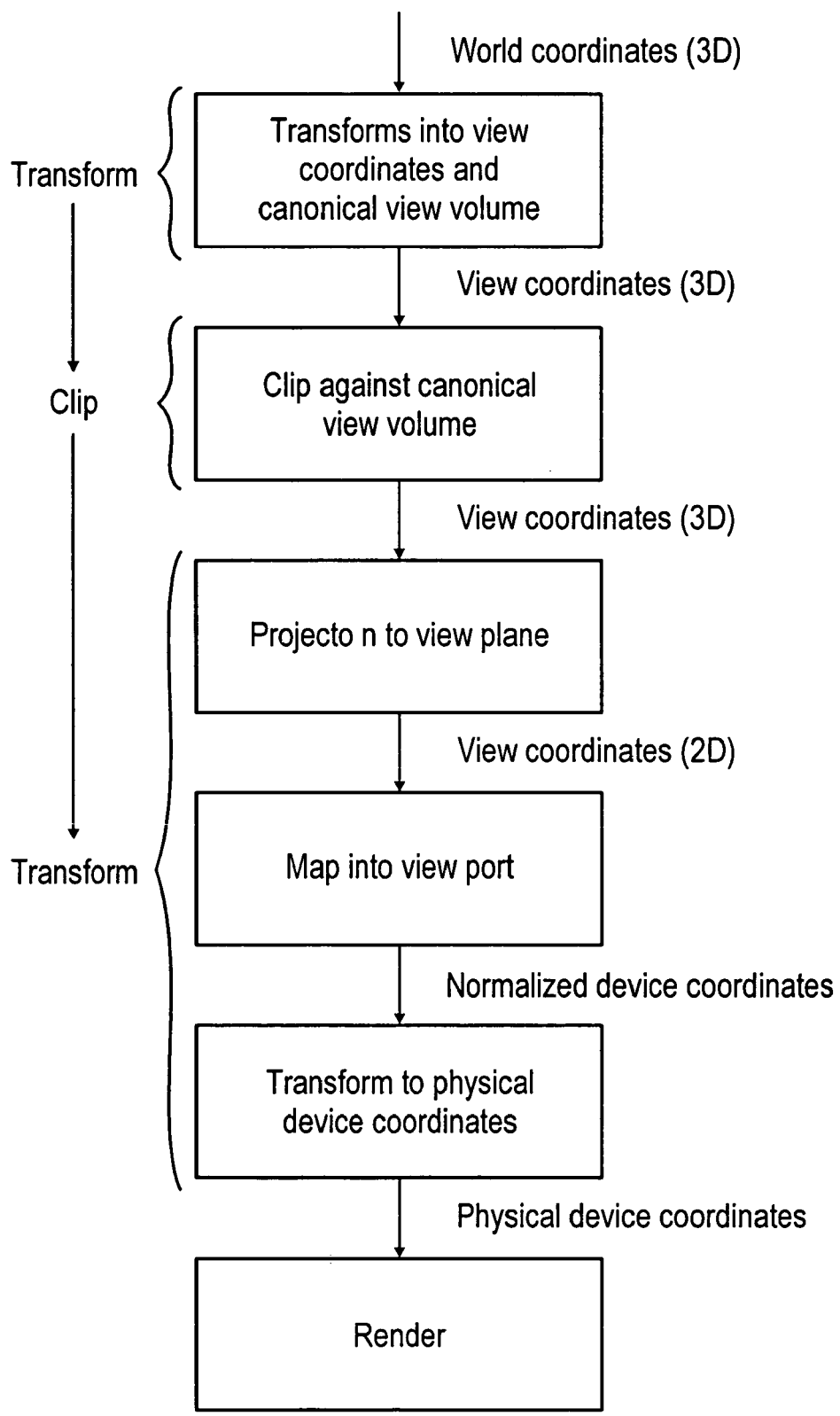
FIG. 2 is a very high-level view of other processes performed in a 3D graphics computer system.

The numerous innovative teachings of the present application will be described with particular reference to the presently preferred embodiment (by way of example, and not of limitation).

Pipelined Architecture

The preferred embodiments presented are implemented in a P3™ or P4™ graphics core produced by 3D Labs, Inc. The overall architecture of the graphics core is best viewed using the software paradigm of a message passing system. In this system, all the processing units are connected in a long pipeline, with communication with the adjacent units being done through message passing. Between each units there is a small amount of buffering, the size being specific to the local communications requirements and speed of the two units. The message rate is variable and depends on the rendering mode. The messages do not propagate through the system at a fixed rate typical of a more traditional pipeline system. If the receiving block can not accept a message, because its input buffer is full, then the sending block stalls until space is available.

The message structure is fundamental to the whole system as the messages are used to control, synchronize and inform each unit about the processing it is to undertake. Each message has two fields—a 96 bit data field and a 11 bit tag field. The data field is a minimum of 96 bits wide but grows wider between some units, especially the texture units where there is more data to pass. The tag field is used by each unit to identify the message type so it knows how to act on it.

Each unit, on receiving a message, can do a number of things:

Not recognize the message so it just passes it on to the next unit;

Recognize it as updating some local state (to the unit) so the local state is updated and the message terminated, i.e. not passed on to the next unit; or Recognize it as a processing action, and if appropriate to the unit, the processing work specific to the unit is done. This action may entail sending out new messages and/or modifying the initial message before sending it on. The most common case is that new data will be appended to the current message to maintain a single message per fragment leading to a fragment rate of one per cycle.

Each unit and the message passing are conceptually running asynchronous to all the others, but in practice is synchronous because of the common clock. How does the host process send messages? The message data field is the 32 bit data written by the host and the message tag is the bottom 11 bits of the address (excluding the byte resolution address lines). Writing to a specific address causes the message type associated with that address to be inserted into the message queue.

The message throughput is 100M messages per second at an assumed clock frequency of 100 MHz. This throughput rate gives a fragment throughput of up to 100M per second, largely independent on what is being rendered.

Linkage

The following block diagram shows how the units are connected together. Some general points are:

The order of the units can be configured in two ways. The most general order (Router, Color DDA, Texture Units, Fog Unit, Alpha Test, LB Rd, Stencil/Depth, LB Wr, Multiplexer) and will work in all modes of OpenGL. However, when the alpha test is disabled it is much better to do the Graphics ID, depth and stencil tests before the texture operations rather than after. This is because the texture operations have a high processing cost and this should not be spent on fragments which are later rejected because of window, depth or stencil tests.

The loop back to the host at the bottom is to provide a simple synchronization mechanism. The host can insert a Sync command and when all the preceding rendering has finished the sync command will reach the bottom host interface which will notify the host the sync event has occurred.

Benefits

The benefits this architecture gives are all due to the very modular nature of it. Each unit lives in isolation from all the others and has a very well defined set of input and output messages. This allows the internal structure of a unit (or group of units) to be changed to make algorithmic/speed/gate count trade-offs. The isolation and well defined logical and behavioral interface to each unit allows much better testing and verification of the correctness of a unit. The message passing paradigm is easy to simulate with software and the hardware design is nicely partitioned. The architecture is self synchronizing for mode or primitive changes.

The host can mimic any unit in the chain by inserting messages which that unit would normally generate. These messages would pass through the earlier units to the mimicked unit unchanged and from then onwards to the rest of the units which cannot tell the message did not originate from the expected unit. This allows for an easy work around mechanism to correct any flaws in the chip. It also allows other rasterisation paradigms to be implemented outside of the chip, but still use the chip for the low level pixel operations.

"A Day in the Life of a Triangle"

It is worth while looking in general terms at how a primitive (e.g. triangle) passes through the pipeline, what messages are generated, and what happens in each unit. Some simplifications have been made in the description to avoid detail which would otherwise complicate what is really a very simple process. The primitive we are going to look at is the familiar Gouraud shaded Z buffered triangle, with dithering. It is assumed any other state (i.e. depth compare mode) has been set up, but (for simplicity) such other states will be mentioned as they become relevant.

The application generates the triangle vertex information and makes the necessary OpenGL calls to draw it.

The OpenGL server/library gets the vertex information, transforms, clips and lights it. It calculates the initial values and derivatives for the values to interpolate ($X_{left}$, $X_{right}$, red, green, blue and depth) for unit change in dx and $dxdy_{left}$. All these values are in fixed point integer and have unique message tags. Some of the values (the depth derivatives) have more than 32 bits to cope with the dynamic range and resolution so are sent in two halves. Finally, once the derivatives, start and end values have been sent to GLINT the 'render triangle' message is sent.

On GLINT: The derivative, start and end parameter messages are received and filter down the message stream to the appropriate blocks. The depth parameters and derivatives to the Depth Unit; the RGB parameters and derivative to the Color DDA Unit; the edge values and derivatives to the Rasterizer Unit.

The 'render triangle' message is received by the rasterizer unit and all subsequent messages (from the host) are blocked until the triangle has been rasterized (but not necessarily written to the frame store). A 'prepare to render' message is passed on so any other blocks can prepare themselves.

The Rasterizer Unit walks the left and right edges of the triangle and fills in the spans between. As the walk progresses messages are send to indicate the direction of the next step: StepX or StepYDomEdge. The data field holds the current (x, y) coordinate. One message is sent per pixel within the triangle boundary. The step messages are duplicated into two groups: an active group and a passive group. The messages always start off in the active group but may be changed to the passive group if this pixel fails one of the tests (e.g. depth) on its path down the message stream. The two groups are distinguished by a single bit in the message tag. The step messages (in either form) are always passed throughout the length of the message stream, and are used by all the DDA units to keep their interpolation values in step. The step message effectively identifies the fragment and any other messages pertaining to this fragment will always precede the step message in the message stream.

The Scissor and Stipple Unit. This unit does 4 tests on the fragment (as embodied by the active step message). The screen scissor test takes the coordinates associated with the step message, converts them to be screen relative (if necessary) and compares them against the screen boundaries. The other three tests (user scissor, line stipple and area stipple) are disabled for this example. If the enabled tests pass then the active step is forwarded onto the next unit, otherwise it is changed into a passive step and then forwarded.

The Color DDA unit responds to an active step message by generating a Color message and sending this onto the next unit. The active step message is then forwarded to the next unit. The Color message holds, in the data field, the current RGBA value from the DDA. If the step message is passive then no Color message is generated. After the Color message is sent (or would have been sent) the step message is acted on to increment the DDA in the correct direction, ready for the next pixel.

Texturing, Fog and Alpha Tests Units are disabled so the messages just pass through these blocks.

In general terms the Local Buffer Read Unit reads the Graphic ID, Stencil and Depth information from the Local Buffer and passes it onto the next unit. More specifically it does:

1. If the step message is passive then no further action occurs.
2. On an active step message it calculates the linear address in the local buffer of the required data. This is done using the (X, Y) position recorded in the step message and locally stored information on the 'screen width' and window base address. Separate read and write addresses are calculated.

3. The addresses are passed to the Local Buffer Interface Unit and the identified local buffer location read. The write address is held for use later.

4. Sometime later the local buffer data is returned and is formatted into a consistent internal format and inserted into a 'Local Buffer Data' message and passed on to the next unit. The message data field is made wider to accommodate the maximum Local Buffer width of 52 bits (32 depth, 8 stencil, 4 graphic ID, 8 frame count) and this extra width just extends to the Local Buffer Write block. The actual data read from the local buffer can be in several formats to allow narrower width memories to be used in cost sensitive systems. The narrower data is formatted into a consistent internal format in this block.

The Graphic ID, Stencil and Depth Unit just passes the Color message through and stores the LBData message until the step message arrives. A passive step message would just pass straight through.

When the active step message is received the internal Graphic ID, stencil and depth values are compared with the ones in the LBData message as specified by this unit's mode information. If the enabled tests pass then the new local buffer data is sent in the LBWriteData message to the next unit and the active step message forwarded. If any of the enabled tests fail then an LBCancelWrite message is sent followed by the equivalent passive step message. The depth DDA is stepped to update the local depth value.

The Local Buffer Write Unit performs any writes which are necessary. The LBWriteData message has its data formatted into the external local buffer format and this is posted to the Local Buffer Interface Unit to be written into the memory (the write address is already waiting in the Local Buffer Interface Unit). The LBWriteCancel message just informs the Local Buffer Interface Unit that the pending write address is no longer needed and can be discarded. The step message is just passed through.

In general terms the Framebuffer Read Unit reads the color information from the framebuffer and passes it onto the next unit. More specifically it does:

1. If the step message is passive then no further action occurs.

2. On an active step message it calculates the linear address in the framebuffer of the required data. This is done using the (X, Y) position recorded in the step message and locally stored information on the 'screen width' and window base address. Separate read and write addresses are calculated.

3. The addresses are passed to the Framebuffer Interface Unit and the identified framebuffer location read. The write address is held for use later.

4. Sometime later the color data is returned and inserted into a 'Frame Buffer Data' message and passed on to the next unit.

The actual data read from the framestore can be in several formats to allow narrower width memories to be used in cost sensitive systems. The formatting of the data is deferred until the Alpha Blend Unit as it is the only unit which needs to match it up with the internal formats. In this example no alpha blending or logical operations are taking place, so reads are disabled and hence no read address is sent to the Framebuffer Interface Unit. The Color and step messages just pass through.

The Alpha Blend Unit is disabled so just passes the messages through.

The Dither Unit stores the Color message internally until an active step is received. On receiving this it uses the least significant bits of the (X, Y) coordinate information to dither the contents of the Color message. Part of the dithering process is to convert from the internal color format into the format of the framebuffer. The new color is inserted into the Color message and passed on, followed by the step message.

The Logical Operations are disabled so the Color message is just converted into the FBWriteData message (just the tag changes) and forwarded on to the next unit. The step message just passes through.

The Framebuffer Write Unit performs any writes which are necessary. The FBWriteData message has its data posted to the Framebuffer Interface Unit to be written into the memory (the write address is already waiting in the Framebuffer Interface Unit).

The step message is just passed through.

The Host Out Unit is mainly concerned with synchronization with the host so for this example will just consume any messages which reach this point in the message stream.

This description has concentrated on what happens as one fragment flows down the message stream. It is important to remember that at any instant in time there are many fragments flowing down the message stream and the further down they reach the more processing has occurred.

Read Monitor Unit

Memory/Processor Intensive Solution

An embodiment of the solution, but not a presently preferred solution can be designed by keeping a record of destination pixels. The Read Units can record which pixels have been read and remove them from the record when an update has occurred or the pixel has been discarded (no update will occur). When a destination pixel is to be read, the record kept by the Read Units is checked to see if the pixel is present (indicating that it is either waiting for an update or has not yet been discarded). If the pixel is present in the record, the read is delayed (suspended) until the pixel has been removed from the record. Once the pixel has been removed, the read can be resumed. If the destination pixel is not in the record, then the read is issued immediately. Once the read has been issued the record is updated with this new destination pixel.

This solution can be implemented with a searchable queue. With each write (update), or cancelled write (discard) the oldest entry in the queue is removed (the queue functions as a FIFO). The queue, which can be implemented as content addressable memory, must be larger than the maximum number of potential outstanding writes. The queue can be implemented in various widths and can be quite wide if a full resolution of destination pixel addresses (and effected bytes) is to be stored. Implementing address aliasing can reduce the width (while reliability is not compromised, more synchronization overhead results as two unique addresses can alias to the same value).

Presently Preferred Embodiment

FIG. 1 is an overview of the graphics rendering subsystem of the presently preferred embodiment of the read-modify-write solution depicting the Read 102, Read Monitor 108, Write 104, and Memory Controller 106 units. The functions of the undescribed features are readily discernible by those skilled in the art. In the presently preferred embodiment the number of suspend/resume transactions is reduced. The goal of the solution to use the suspend read mechanism while reducing the number of times it is invoked to an occasional level (for example, every 8–16 primitives). However, it is still possible that the suspend/resume transaction is invoked at every primitive rendering. The maximum number of non-empty primitives that can be rendered without invocation of a suspend/resume transaction is 32 (32 is the chosen implementation number in the presently preferred embodiment, but could be more or less depending on the number of gates to commit to this function).

Figure 4:
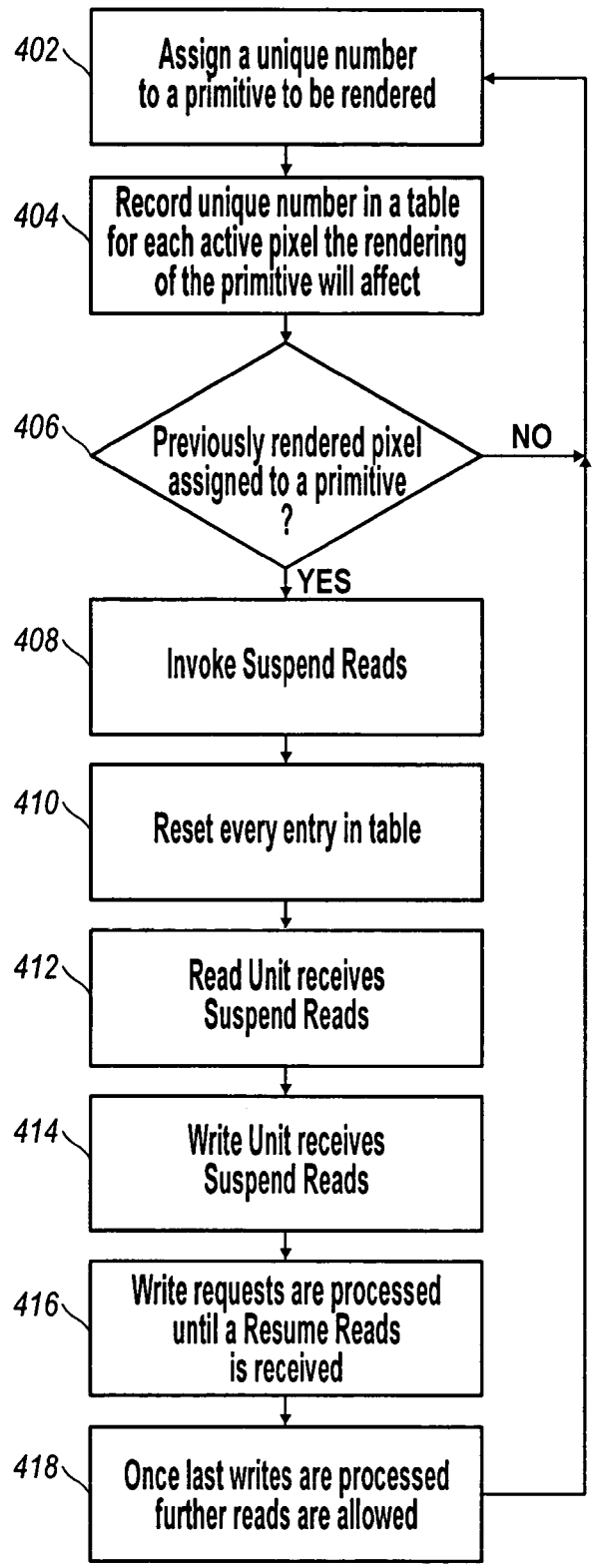
FIG. 4 depicts a flow chart of the presently preferred embodiment.

FIG. 4 depicts a flow chart of the presently preferred embodiment. In the presently preferred embodiment, a Read Monitor Unit 108 is incorporated to track primitives and the pixels they affect as they are prepared for rendering. A unique number is assigned to each primitive before it is rendered (Step 402). The number is recorded in a table for each active pixel the rendering of the primitive will affect. (Step 404).

Before the table is updated for a pixel (initiated by an active step during rendering), the table is tested to see if any previously rendered primitives have been assigned to the pixel position (that is, the rendering of the previous primitive affected the pixel) (Step 406). If the pixel location has been previously touched, a SuspendReads command is invoked and sent down the pipeline (Step 408). When the Suspend-Reads command is invoked, every entry in the Read Monitor Unit 108 table is reset (marked invalid) (Step 410). The Read Unit 102 receives and writes the message to its address FIFO (Step 412). The message is also forwarded down the pipeline. The Read Unit 102 continues to generate messages to the address FIFO. However, the Memory Controller 106 will not issue reads on these addresses. Once the Write Unit 104 receives the SuspendsReads message, it inserts the message into its queue (as a ResumeReads message for the Memory Controller 106) (Step 414). The message is also forwarded down the pipeline. Write requests are processed by the Memory Controller 106 until the ResumeReads message is reached (Step 416). Once the 106 Controller knows the last writes have completed (or are unconditionally committed) and the table in the Read Monitor Unit 108 is reset, the ResumeReads message is acted upon and the read portion of the Memory Controller 106 is released to allow further reads (Step 420). In this scenario, it is possible that a Suspend-Reads transaction need not be invoked. This situation occurs if the SuspendReads transaction would be redundant due to a previously affected pixel being touched far enough back in time for the memory location which holds its information to have been updated.

Table Length

In the presently preferred embodiment, the length of the table and the hashing function used to generate an aliased address from a pixel's xy coordinate will determine how frequently two unique pixels will resolve to the same address. Resolution of two different pixels (from different primitives) to the same address will result in an unnecessary suspension of reads to be invoked. While, this type of aliasing does not result in any read-before-write errors, it has the consequence of introducing delays to the rendering process. In the presently preferred embodiment, the main hashing function supported concatenates the low order bits of the x and y coordinate, giving equal weight for all orientations. With for example, a table size of 1K, a 32×32 pixel cell is represented. This cell size accommodates up to eight 25 pixel triangles in a strip before a suspend read is needed.

Table Width

If addressing of pixel information is aliased, it is possible for primitives to resolve to the same address value even though the affected pixels are unrelated. If this aliasing problem occurs, then it is possible (depending on the width of the table) for the second primitive to issue a read while an outstanding write for the same pixel of its aliased partner is still present in the system. It is possible to increase the width of the table to prevent this situation from occurring. However, in the presently preferred embodiment, the table is reset when the primitive ID rolls over. This rollover will introduce a fixed rate of suspend reads every $2^{width}$ primitives. In the presently preferred embodiment, the table width has been set as 5 bits. Therefore, with every 32nd primitive a SuspendReads transaction is executed. This width and frequency results in an amortized cost of approximately 1.5 cycles per primitive.

Performance Using Antialiased Primitives

The above scheme handles macro level read-modify-write synchronization issues. However, antialiased primitives are virtually guaranteed to share pixels with their neighbors. This situation can result in a SuspendRead for each primitive. The most important antialiased primitive is lines. With a SuspendReads cost in the framebuffer of 42 cycles, the effective antialiased line rate is 2.9M. To improve the antialiased line performance, a mechanism to handle the micro level read-modify-write synchronization is needed.

In the presently preferred embodiment, the write pixel data for the recently processed pixels is held in a history list. The history list exists within the units which can modify read pixel data, for example, the Stencil Depth Unit 112 and the Alpha Blend Unit 110. Within these units, when an active step is received, the history list is checked to see if it holds a copy of the data written to this pixel. If it does, then the data in the history list is used instead of the read data accompanying the active step. Use of this technique anticipates that the read data is stale because the last data calculated for the recently calculated pixels, i.e., what is in the history list, may not have had enough time to work its way though the pipelines into memory.

The Read Monitor Unit 108 also tracks recent pixels in a history list and when it finds a match it avoids sending out a SuspendRead.

If the history list is made large enough to hold all pixels which can be pipelined between the read unit and the write unit, about 128 pixels, then the SuspendReads mechanism would be rendered redundant. In the presently preferred embodiment, a history list length of 8 pixels is used.

Embodiment Without Periodic Clear

This embodiment functions similarly to the presently preferred embodiment described above except as hereinafter described. In this embodiment a table which is two bits wide is used by the Read Monitor Unit 108 to track pixels which have been touched by a rendered primitive (or "dirty" pixels). The first bit of each table row is called the dirty bit and the second bit of each table row is referred to as the primTouched bit. The xy coordinate of each pixel is used to index the table. The table is kept to a manageable size by indexing the pixels with a hash function. A hash function allows the mapping of the entire pixel range into a number range small enough to remain manageable. In the presently preferred embodiment, the lower 5 bits of the x and y values of a pixel are concatenated together to yield a 10 bit index to the table. Alternatively, the XOR of the x and y values can be used.

The dirty bit for each pixel tracks whether that pixel has been affected by a primitive since the last SuspendReads command was invoked. The primTouched bit for each pixel tracks whether the pixel has been touched by the current primitive.

At the start of rendering (or whenever a SuspendReads command is invoked) all the entries in the table for all pixels are reset. At the start of rendering for each primitive, each primTouched bit for each pixel in the table is reset. For each pixel affected by a primitive, it's corresponding dirty bit in the table is checked. If the bit has been set, a SuspendReads command is issued and the table is reset. Once the table is reset, processing of the current primitive is resumed. If the dirty bit of a particular pixel which will be affected by rendering the primitive is clear, then it is safe to issue a read of the pixel information. The primTouched bit of the pixel's row is set to record the fact that the pixel has been read (touched).

Once the primitive has been rendered, all the primTouched bits for the affected pixels are stored into their corresponding dirty bit entries. This transfer maintains an accumulated record of affected pixels. This embodiment offers the advantage of avoiding an automatic Suspend Reads and clearing of the table every 32 primitives.

System Context

Figure 3:
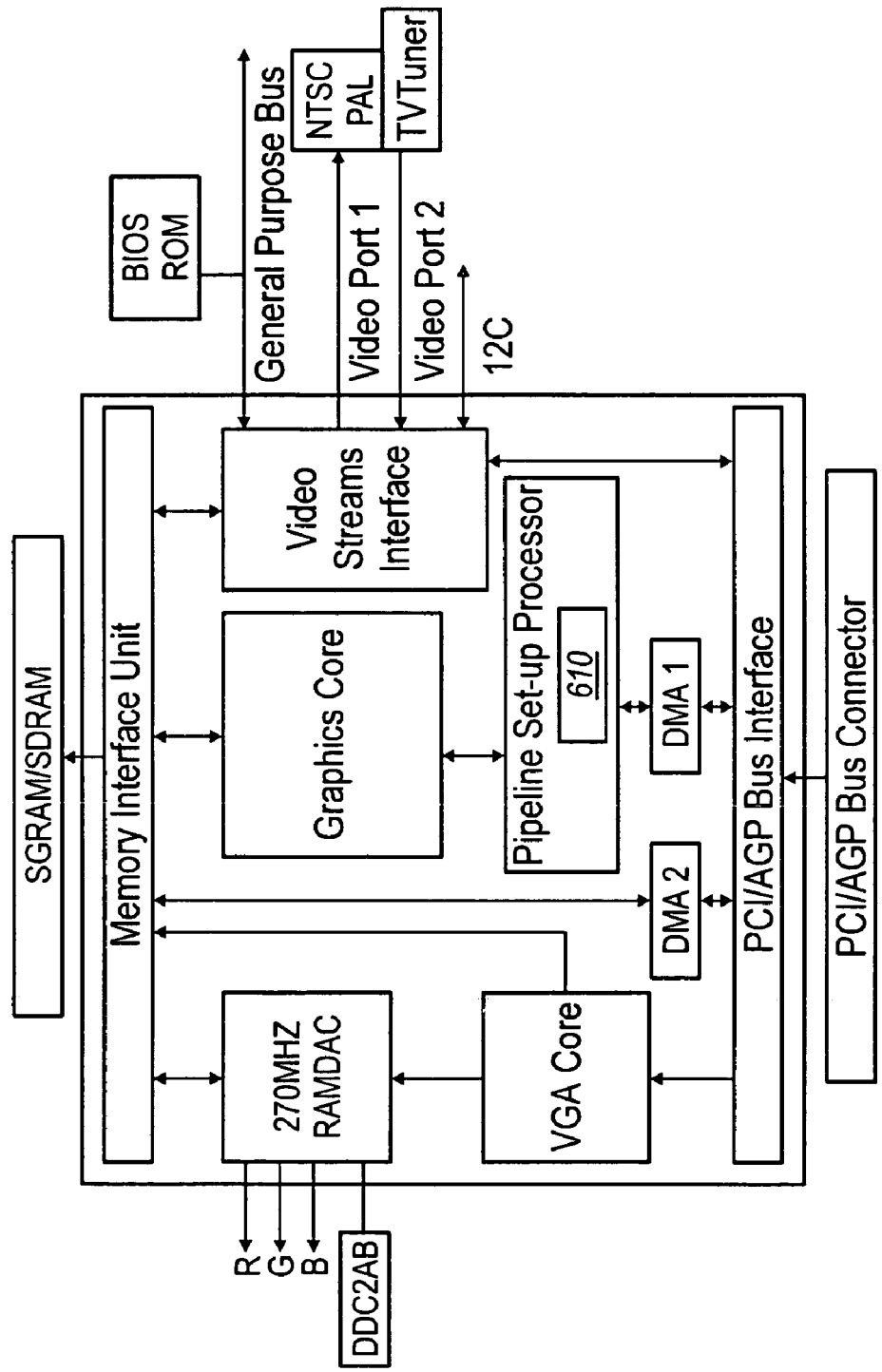
FIG. 3 shows a block diagram of a graphics processor which can incorporate the read-modify-write solutions in its rendering subsystem.

FIG. 3 shows a block diagram of a graphics processor which can incorporate the disclosed embodiments of the read-modify-write solutions in its rendering subsystem. A sample board incorporating the P3™ or P4™ graphics processor may include:

- the P3™ or P4™ graphics core itself;
- a PCI/AGP interface;
- DMA controllers for PCI/AGP interface to the graphics core and memory;
- SGRAM/SDRAM, to which the chip has read-write access through its frame buffer (FB) and local buffer (LB) ports;
- a RAMDAC, which provides analog color values in accordance with the color values read out from the SGRAM/SDRAM; and
- a video stream interface for output and display connectivity.

Behavioral Model

The following pseudo-code describes the operation of the disclosed Read Monitor Unit 108 in its presently preferred embodiment. Of course, many other implementations which express the operation of a read monitor unit can exist. The code below merely provides an example and is not meant to limit the disclosed Read Monitor Unit 108 in scope or embodiment in any way.

```
enum {eConcat, eXOR};
struct MonitorInfo
{
    uint5   primID;
    bool    valid;
};
struct HistoryInfo
{
    bool    valid;
    int16   x;
    int16   y;
};
```

```
const int    kTableSize = 1024;
const int    kMaxPrimCount = 31;            // for a 5 bit field
const  int kHistoryListLength = 8;
ReadMonitorMode               readMonitorMode;
// Internal state.
bool                          needNewPrimCount;
bool                          tableDirty;
uint5                         primCount;
MonitorInfo                   monitorTable[kTableSize];
unit3                         historyOffset;
HistoryInfo                   historyList[kHistoryListLength];
on reset
{
            ResetMonitor ( );
            needNewPrimCount = true;
}
forever
{
    uint11   tag;
    uint96   data;
    Wait for message in the input FIFO;
    Extract tag and data from input FIFO;
    switch (tag)
    {
        case ReadMonitorMode_Tag:
                readMonitorMode = data;           break;
        case ReadMonitorModeAnd_Tag:
                readMonitorMode &= data;          break;
        case ReadMonitorModeOr_Tag:
                readMonitorMode |=data;           break;
        case SuspendReads_Tag:
            SendMessageWide (tag, data);
            if (tableDirty || bit 0 of data)
            {
            SendMessage32 (LBDestReadModeOr_Tag, 0);
            SendMessage32 (FBDestReadModeOr_Tag, 0);
                ResetMonitor ( );
            }
            break;
        case WaitForCompletion_Tag:
                                      SendMessageWide (tag, data);
                                      if (tableDirty)
                                           ResetMonitor ( );
                                      break;
        case PrepareToRender_Tag:     needNewPrimCount = true;
                                      SendMessageWide (tag, data);
                                      break;
        case ActiveStepX_Tag:
        case ActiveStepYDomEdge_Tag:
                                      if (readMonitorMode.Enable)
                                      ProcessActiveStep (data);
                                      SendMessageWide (tag, data);
                                      break;
        case ContextDump_Tag: ContextDump (data);
                                      SendMessageWide (tag, data);
                                      break;
        case ContextRestore_Tag:      SendMessage32 (SuspendRead_
                                      Tag, 0);
                                      ResetMonitor ( );
                                      SendMessageWide (tag,
    data);
                                      ContextRestore (data);
                                      break;
        default:                      SendMessageWide (tag, data);
                                      break;
    }
    Flush the input message;
}
void ResetMonitor (void)
{
    ResetValidFlags ( );
    ResetHistoryList ( );
    primCount = 0;
    tableDirty = false;
}
void ResetValidFlags (void)
{
    uint11   i;
    // VHDL clears valid bits in parallel. It can take upto 8
```

-continued
```
            // cycles to clear the whole table.
            for (i = 0; i < kTableSize; i++)
                monitorTable[i].valid = false;
}
void ProcessActiveStep (uint96 data)
{
    uint10   i;
    if (needNewPrimCount)
    {
        // Only process primitives with one or more active
        // steps. When we are running in stripe mode many of
        // the small primitives will be empty (until Gamma 3)
        // to they can be ignored for monitoring purposes.
            if (primCount == kMaxPrimCount)
            {
                // It is going to roll over so restart the moni-
                // toring window and make the memories sync up
                // their reads and writes.
                    SendMessage32 (SuspendReads_Tag, primCount);
                    ResetMonitor ( );
            }
            else
            {
                primCount++;
            }
            needNewPrimCount = false;
    }
    // Check in the table to see if we are going to touch
    // another pixel we have down for an earlier primitive.
    i = HashCoordinates (data);
    if (monitorTable[i].valid)
    {
        if (monitorTable[i].primID == primCount)
        {
            // We are trying to update a pixel which belongs
            // to this primitive. This can never cause a
            // problem due to the rasterisation rules not
            // allowing the same pixel to be touched more than
    // once so we can just return.
                return;
        }
        else
        {
            // We are trying to process a pixel we already
            // have marked for a differernt primitive. If it
            // is not a recent pixel - we will get a miss read
    // unless we issue a suspend read.
            if (!SearchHistoryList (data))
            {
                // Not found on the history list so we need to
                // do a Suspend Reads.
                    SendMessage32 (SuspendReads_Tag, primCount);
                    // Force the LB and FB read caches to be invali-
                    // dated.
                    SendMessage32 (LBDestReadModeOr_Tag, 0);
                    SendMessage32 (FBDestReadModeOr_Tag,0);
                    ResetMonitor ( );
            }
        }
    }
    // This is the first visit to this pixel so update and
    // return.
    monitorTable[i].valid = true;
    monitorTable[i].primID = primCount;
    tableDirty = true;
}
// This function maps the xy coordinate of the fragment into the      //
monitor table. Disparate xy values will map to the same                //
location.
uint10 HashCoordinates (uint96 data)
{
    int16 x, y;
    x = bits 0 . . . 15 of data;
    y = bits 16 . . . 31 of data;
    y += readMonitorMode.StripeOffset;
    // Remove bits (if any) from y between the StripePitch and
    // StripHeight to compress the range of y so we don't waste       //
table entries on scanlines we don't own. The Pitch and
Height are held as powers
```
```
    // of two so are already measured in bits.
    y = ((y >> readMonitorMode.StripePitch)                          <<
readMonitorMode.StripeHeight)
            | (y & ((1 << readMonitorMode.StripeHeight) -
1));
    // Combine bits from x and y to form the index into the
    // table. This is done by extracting the ls 5 bits from x        //
and y and concatenating them, or from xoring 10 ls bits              // from
x and y together.
        if (readMonitorMode.HashFunction == eXOR)
        {
            return x ^ y;                                            // unused
upper bits are discarded
        }
        else
        {
            return (x & 0x1f) | (y << 5); // unused upper bits are
discarded
        }
}
void    ResetHistoryList (void)
{
    unit4    i;
    for (i = 0; i <kHistoryListLength; i++)
        historyList[i].valid = false;
    historyOffset = 0;
}
bool SearchHistoryList (unit96 data)
{
    unit4    i;
    int16    x, y;
    x = bits 0 . . . 15 of data;
    y = bits 16 . . . 31 of data;
    if (!readMonitorMode.PixelHistoryEnable)
        return false;
    for (i = 0; i < kHistoryListLength; i++)
    {
        if ((historyList[i].valid == true) &&
            (historyList[i].x == x) && (historyList[i].y ==
y))
            return true;
    }
    return false;
}
void UpdateHistoryList (unit96 data)
[
    int16 x, y;
    x = bits 0 . . . 15 of data;
    y = bits 16 . . . 31 of data;
    if (readMonitorMode.PixelHistoryEnable)
    {
        historyList[historyOffset.x = x;
        historyList[historyOffset].y = y;
        historyList[historyOffset].valid = true;
        historyOffset++;
    }
}
void SendMessageWide (unitil tag, unit96 in Data)
{
    Wait for room in M FIFO;
    Send message using tag and the data field set from:
        bits 0 . . . 95 set from bits 0 . . . 207 of inData,
}
void SendMessage32 (uint11 tag, uint32 inData)
{
    Wait for room in M FIFO;
    Send message using tag and the data field set from:
        bits 0 . . . 31 taken from inData,
        bits 32 . . . 95 set to zero;
}
void ContextDump (uint32 contextMask)
{
    uint5    i;
    if (contextMask.RasteriserState)
        SendMessage32 (ContextData_Tag, ReadMonitorMode);
}
```

-continued

```
void ContextRestore (uint32 contextMask)
{
    uint32   cd;
    uint5 i;
    if (contextMask.RasteriserState)
    {
        readMonitorMode = ContextData ( );
    }
}
uint32 ContextData (void)
{
    Wait for input message;
    if (message tag == ContextData_Tag)
        return message data;
    else
        Abort context restore and process incoming message as
        normal;
}
```

The following background publications provide additional detail regarding possible implementations of the disclosed embodiments, and of modifications and variations thereof. All of these publications are hereby incorporated by reference: see, e.g., ADVANCES IN COMPUTER GRAPHICS (ed. Enderle 1990-); Chellappa and Sawchuk, DIGITAL IMAGE PROCESSING AND ANALYSIS (1985); COMPUTER GRAPHICS HARDWARE (ed. Reghbati and Lee 1988); COMPUTER GRAPHICS: IMAGE SYNTHESIS (ed. Joy et al.); Foley et al., FUNDAMENTALS OF INTERACTIVE COMPUTER GRAPHICS (2.ed. 1984); Foley, COMPUTER GRAPHICS PRINCIPLES & PRACTICE (2.ed. 1990); Foley, INTRODUCTION TO COMPUTER GRAPHICS (1994); Giloi, Interactive Computer Graphics (1978); Hearn and Baker, COMPUTER GRAPHICS (2.ed. 1994); Hill, COMPUTER GRAPHICS (1990); Latham, DICTIONARY OF COMPUTER GRAPHICS (1991); Magnenat-Thalma, IMAGE SYNTHESIS THEORY & PRACTICE (1988); Newman and Sproull, PRINCIPLES OF INTERACTIVE COMPUTER GRAPHICS (2.ed. 1979); PICTURE ENGINEERING (ed. Fu and Kunii 1982); PICTURE PROCESSING & DIGITAL FILTERING (2.ed. Huang 1979); Prosise, How COMPUTER GRAPHICS WORK (1994); Rimmer, BIT MAPPED GRAPHICS (2.ed. 1993); Salmon, COMPUTER GRAPHICS SYSTEMS & CONCEPTS (1987); Schachter, COMPUTER IMAGE GENERATION (1990); Watt, THREE-DIMENSIONAL COMPUTER GRAPHICS (2.ed. 1994); Scott Whitman, MULTIPROCESSOR METHODS FOR COMPUTER GRAPHICS RENDERING; the SIGGRAPH PROCEEDINGS for the years 1980–1998; and the *IEEE Computer Graphics and Applications* magazine for the years 1990–1998.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

In addition to the solutions described herein, other hardware and software could be added to the graphics pipeline or as auxiliaries to the pipeline to implement the described functions.

A history list of 8 pixels is used in the presently preferred embodiment. However, a larger history list could be used to further avoid suspension of reads.

What is claimed is:

1. A method for rendering 3D graphics, comprising the steps of:
    rendering primitives which comprise a graphics display;
    invoking suspension of reads of pixel information during rendering of primitives only selectively; and
    writing data generated by said rendering step into a frame buffer, and outputting data from said frame buffer at video rates.

2. The method of claim 1, wherein said rendering is performed in a rendering system which includes at least four functionally distinct processing units, allocated to individual rendering operations, connected in a pipeline relationship.

3. The method of claim 1, wherein a table of pixel information is used to determine if reads should be suspended.

4. The method of claim 1, wherein reads are suspended if a primitive being rendered will affect a pixel location which has been previously touched by the rendering of a primitive and has not yet been updated.

5. The method of claim 1, wherein a table of pixel information to determine if reads should be suspended, said table comprising a first bit and a second bit and wherein said first bit flags all pixels whose information has not yet been updated or discarded and said second bit flags pixels which will be affected by said primitive to be rendered.

6. The method of claim 1, wherein said invoking step is not performed if a primitive to be rendered appears in a history list of recently rendered primitive data.

7. A method for rendering 3D graphics, comprising the steps of:
    providing data to be rendered to a rendering system which includes at least four functionally distinct processing units connected in a pipeline relationship;
    allocating individual rendering operations to respective ones of said processing units, and performing said rendering operations;
    invoking suspension of reads of pixel information during rendering of primitives only selectively; and
    writing data generated by said processing units into a frame buffer, and outputting data from said frame buffer at video rates.

8. The method of claim 7, wherein a table of pixel information is used to determine if reads should be suspended.

9. The method of claim 7, wherein reads are suspended if a primitive being rendered will affect a pixel location which has been previously touched by the rendering of a primitive and has not yet been updated.

10. The method of claim 7, wherein a table of pixel information to determine if reads should be suspended, said table comprising a first bit and a second bit and wherein said first bit flags all pixels whose information has not yet been updated or discarded and said second bit flags pixels which will be affected by said primitive to be rendered.

11. The method of claim 7, wherein said invoking step is not performed if a primitive to be rendered appears in a history list of recently rendered primitive data.

12. A method of computer graphics memory management, comprising the actions of:
    tracking each pixel touched by rendered primitives in a table by setting a flag in said table corresponding to each touched pixel;
    suspending reads of pixel information if a pixel that will be touched by a primitive to be rendered is flagged; and clearing said flags and resuming reads after pixel information of said flagged pixels has been updated or discarded.

13. The method of claim 12, wherein said table comprises a first bit and a second bit and wherein said first bit flags all pixels whose information has not yet been updated or discarded and said second bit flags pixels which will be affected by said primitive to be rendered.

14. The method of claim 12, wherein said flags corresponding to said pixels are indexed according to the xy coordinates of said pixels.

15. The method of claim 12, wherein suspending and clearing steps are not performed if said primitive to be rendered appears in a history list of recently rendered primitive data.

16. A method of computer graphics memory management, comprising the actions of:
tracking each pixel touched by rendered primitives in a table comprised of a first bit entry and second bit entry for each pixel;
setting a flag in said second bit entry corresponding to each pixel which will be touched by a primitive to be rendered;
copying said flagged second bit entries to said first bit entries after each primitive is rendered;
suspending reads of pixel information if said first bit entry of a pixel that will be touched by a primitive to be rendered is flagged; and
clearing all flags and resuming reads after pixel information of all said flagged pixels has been updated or discarded.

17. The method of claim 16, wherein a table is used to store said flags.

18. The method of claim 16, wherein a table is used to store said flags, said table comprising a first bit and a second bit and wherein said first bit flags all pixels whose information has not yet been updated or discarded and said second bit flags pixels which will be affected by said primitive to be rendered.

19. The method of claim 16, wherein said flags corresponding to said pixels are indexed according to the xy coordinates of said pixels.

20. The method of claim 16, wherein suspending and clearing steps are not performed if said primitive to be rendered appears in a history list of recently rendered primitive data.

21. A method of computer graphics memory management, comprising the actions of:
keeping a record of each pixel affected by a rendered primitive;
removing a pixel from said record if said pixel information is updated or discarded; and
suspending reads of pixel information if a primitive to be rendered will affect a pixel whose entry remains in said record.

22. The method of claim 21, wherein said record is kept in a table.

23. The method of claim 21, wherein said record is kept in a table, said table comprising a first bit and a second bit and wherein said first bit flags all pixels whose information has not yet been updated or discarded and said second bit flags pixels which will be affected by said primitive to be rendered.

24. The method of claim 21, wherein said suspending step is not performed if said primitive to be rendered appears in a history list of recently rendered pixel data.

25. A method of computer graphics memory management, comprising the actions of:
tracking each primitive to be rendered and the pixel information each said primitive will affect; and
suspending reads of pixel information between rendering of each said primitive only if the primitive to be rendered will affect pixel information that has been previously rendered and has not had sufficient time to update.

26. The method of claim 25, wherein a table is used to track said primitives.

27. The method of claim 25, wherein a table is used to track said primitives, said table comprising a first bit and a second bit and wherein said first bit flags all pixels whose information has not yet been updated or discarded and said second bit flags pixels which will be affected by said primitive to be rendered.

28. The method of claim 25, wherein said suspending step is not invoked if said primitive to be rendered appears in a history list of recently rendered primitive data.

29. A method of computer graphics memory management, comprising the actions of:
assigning a unique identifier to each primitive before it is rendered;
tracking the pixels affected by each rendered primitive using said unique identifier; and
if a primitive to be rendered will affect pixel information that has been affected by a previously rendered primitive, suspending reading of primitive information unless said affected pixel information has been updated.

30. The method of claim 29, wherein a table is used to track said pixels with said unique identifier.

31. The method of claim 29, wherein reads are not suspended if said primitive to be rendered appears in a history list of recently rendered primitive data.

32. The method of claim 29, wherein a table is used to track said pixels with said unique identifier, said table comprising a first bit and a second bit and wherein said first bit flags all pixels whose information has not yet been updated or discarded and said second bit flags pixels which will be affected by said primitive to be rendered.

33. A pipelined graphics system, comprising:
display hardware; and
video rendering hardware comprising, a read unit to read information regarding a primitive to be rendered to be displayed by said display hardware, a write unit to update modified information regarding primitives, and a read monitor unit to prevent primitive information which has been modified from being read by said read unit before said write unit has updated said information;
wherein said read monitor unit tracks pixel information affected by previously rendered primitives and suspends reads if a primitive to be rendered will affect pixel information which has been affected by a previously rendered primitive until said pixel information has had time to update.

34. The system of claim 33, wherein said read monitor unit implements a table to track said pixel information.

35. The system of claim 33, wherein said read monitor unit implements a table to track said pixel information, said table comprising a first bit and a second bit and wherein said first bit flags all pixels whose information has not yet been updated or discarded and said second bit flags pixels which will be affected by said primitive to be rendered.

36. The system of claim 33, wherein said read monitor does not suspend reads if said primitive to be rendered appears in a history list of recently rendered primitive data.

37. A graphics processing subsystem, comprising:
- at least four functionally distinct processing units, each including hardware elements which are customized to perform a rendering operation which is not performed by at least some others of said processing units; at least some ones of said processing units being connected to operate asynchronously to one another; and
- a frame buffer, connected to be accessed by at least one of said processing units;
- said processing units being mutually interconnected in a pipeline relationship, such that said processing units jointly provide a pipelined multiple-instruction-multiple-device (MIMD) graphics processing architecture; wherein suspension of reads of pixel information during rendering of primitives is invoked only selectively.

38. The subsystem of claim 37, wherein a table is used to determine if reads should be suspended.

39. The subsystem of claim 37, wherein a table is used to determine if reads should be suspended, said table comprising a first bit and a second bit and wherein said first bit flags all pixels whose information has not yet been updated or discarded and said second bit flags pixels which will be affected by said primitive to be rendered.

40. The subsystem of claim 37, wherein suspension of reads is invoked unless said primitive to be rendered appears in a history list of recently rendered primitive data.

* * * * *